June 25, 1935. J. W. FOWLER ET AL 2,006,044

CABLE CLAMP

Filed June 5, 1933

Inventors
Jess W. Fowler
Christopher N. Baillio

By Hardway Cather
Attorneys

Patented June 25, 1935

2,006,044

UNITED STATES PATENT OFFICE 2,006,044

CABLE CLAMP

Jess W. Fowler, Houston, and Christie N. Baillio, Beaumont, Tex.

Application June 5, 1933, Serial No. 674,362

1 Claim. (Cl. 24—115)

This invention relates to a cable clamp.

An object of the invention is to provide a clamp of the character described specially designed for use in clamping wire lines or cables.

Another object of the invention is to provide a clamp of the character described whereby the free end of a cable may be securely clamped to the main cable to form a loop or tie, and whereby the cable will be securely held and prevented from slippage.

The clamp has been specially designed for use in the formation of a loop at the dead end of a drilling line or cable used in carrying on well drilling operations, but is of such construction that it may be used generally for clamping wire lines or cables wherever desired.

With the above and other objects in view the invention has particular relation to certain novel features of construction, use and arrangement of parts, an example of which is given in this specification and illustrated in the accompanying drawing wherein.

Figure 1:
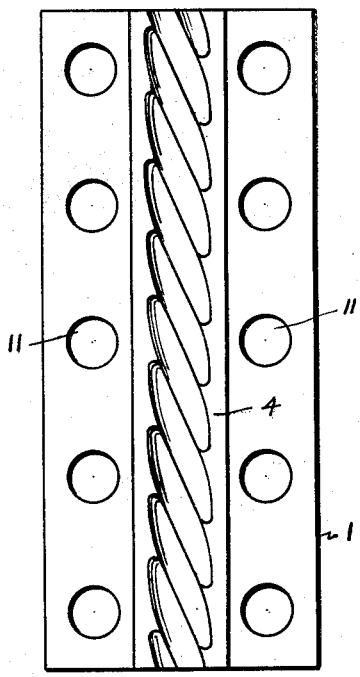
Figure 1 shows an inside view of one of the clamp jaws.
Figure 2:
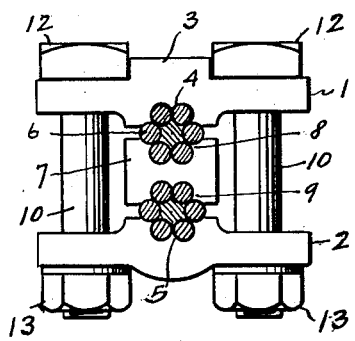
Figure 2 shows an end view of the complete clamp.

Referring now more particularly to the drawing wherein like numerals of reference designate similar parts in each of the figures, the numerals 1, 2 designate the clamp jaws which are approximately similar in shape. Each jaw is preferably rectangular in plan view and the jaw 1 has a central longitudinal rib 3 on its outer side. The jaws have the inside, confronting seats as 4, 5 extending longitudinally thereof and located approximately centrally of the jaws. These seats are shaped to conform to the contour of and to snugly receive a wire line or cable as 6.

There is a spacer block 7 between the jaws and approximately of the same length as the jaws and the opposite sides of this block have the cable seats 8, 9 confronting the respective seats 4, 5, and of a similar shape so as to also snugly receive the cables seated in said seats 4, 5.

The jaws 1, 2 are held in clamping relation with the cable by means of bolts 10. These bolts are fitted through the bearings 11 of the jaws 1, 2 with their heads 12 abutting against opposite sides of the rib 3 and with the nuts 13 threaded unto the other ends thereof. The heads 12 abut against the adjacent sides of the rib 3 so as to hold the bolts 10 against turning while the nuts 13 are being screwed up or unscrewed.

Figure 3:
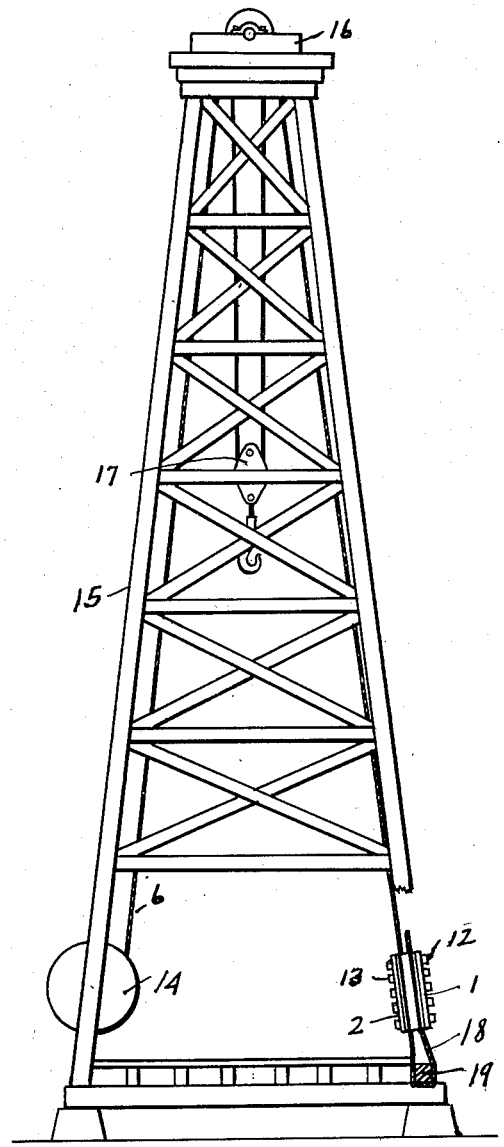
Figure 3 illustrates an application of the clamp to a cable.

As illustrated in Figure 3, one end of the cable 6 is wound on a draw works drum 14 of the derrick 15 of a drilling rig and this cable is threaded over the sheaves of the conventional derrick crown block 16 and over the sheaves of the conventional traveling block 17 and the dead end 18 of said cable may be looped around the timber 19 of the derrick foundation and the sides of the loop then secured together by the clamp in the manner hereinbefore explained and as illustrated in said Figure 3.

In carrying on drilling operations very heavy loads are carried by the traveling block 17 and the cable is consequently subjected to great tension and it is therefore necessary that the dead end of the cable be securely anchored to the derrick. The cable clamp herein described has been specially designed for that purpose, although it is capable of general use.

The drawing and description now disclosed what is considered to be a preferred form of the invention by way of illustration only, while the broad principle of the invention will be defined by the appended claim.

What we claim is:

A cable clamp comprising a pair of opposing, approximately rectangular clamp jaws, each jaw having an inwardly thickened longitudinal central portion, confronting seats in said thickened portions extending longitudinally from end to end thereof, each seat having parallel spiralled grooves, said seats and grooves being shaped to conform to the contour of and to snugly receive a wire cable, a spacer block between the jaws and approximately of the same length as the jaws, the opposite sides of the said block being provided with cable seats which confront the seats of the respective jaws and which are shaped to snugly receive a wire line, said jaws having marginal bearings, bolts fitted through the bearings of the respective jaws and having heads on one end and nuts on the other end, one of said clamp jaws having an external central longitudinal rib against which the bolt heads abut to maintain the bolts against turning.

J. W. FOWLER.
CHRISTIE N. BAILLIO.